United States Patent Office 3,824,306
Patented July 16, 1974

3,824,306
INSECTICIDAL AND FUNGICIDAL COMPOSITION
Hiroshi Tsuchiya, Ashiya, Kunio Mukai, Nishinomiya, Akio Kimura, Ikeda, Suminori Kawano, Minoo, Keimei Fujimoto, Kobe, Toshiaki Ozaki, Sigeo Yamamoto, and Yositosi Okuno, Toyonaka, Katsutoshi Tanaka, Takarazuka, and Tadashi Ooishi and Hisami Takeda, Minoo, Japan, assignors to Sumitomo Chemical Company, Ltd., Osaka, Japan
No Drawing. Original application Nov. 3, 1969, Ser. No. 873,503, now Patent No. 3,725,514. Divided and this application Jan. 15, 1973, Ser. No. 323,714
Claims priority, application Japan, Nov. 12, 1968, 43/82,963; Nov. 14, 1968, 43/83,366
Int. Cl. A01n 9/36
U.S. Cl. 424—225                    6 Claims

ABSTRACT OF THE DISCLOSURE

An insecticidal or fungicidal composition which has strongly insecticidal or fungicidal activity and low toxicity to mammals, containing an organic phosphorothiolate having the formula, $$B-O-\underset{\underset{O R}{|}}{\overset{\overset{O}{\|}}{P}}-S-A$$

wherein R is lower alkyl; A is alkyl, haloalkyl or phenylalkyl; B is a group of the formula,

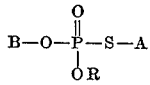

X being phenyl, phenylalkyl, or halogen, provided that at least one X is a group other than halogen atom, and $n$ being an integer of 1–5 is disclosed.

---

This is a division of application Ser. No. 873,503, filed Nov. 3, 1969, now U.S. Pat. 3,725,514.

This invention relates to novel organic phosphorothiolates. Further, the present invention pertains to a process for preparing said novel organic phosphorothiolates and to insecticidal and fungicidal compositions containing said compounds as active ingredients.

More particularly, the invention is concerned with novel organic phosphorothiolates having the formula, $$B-O-\underset{\underset{O R}{|}}{\overset{\overset{O}{\|}}{P}}-S-A \qquad (I)$$

wherein R is $C_1-C_4$ alkyl; A is $C_1-C_{10}$ alkyl, $C_3-C_5$ alkenyl, $C_3-C_5$ alkinyl, $C_1-C_3$ haloalkyl or $C_7-C_{10}$ phenylalkyl; B is a group of the formula,

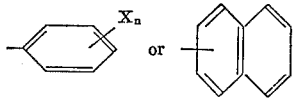

X being phenyl, $C_7-C_{10}$ phenylalkyl, $C_1-C_5$ alkoxy, $C_2-C_8$ dialkylamino $C_1-C_5$ acylamido or halogen atom, provided that at least one X is group other than halogen atom; and $n$ being an integer of 1–5; a process for preparing said compounds; and insecticidal and fungicidal compositions containing said compounds as active ingredients.

O,O - Dimethyl-O-p-nitrophenylphosphorothioate and organomercury preparations, which are used in large quantities at present, are high in toxicity to mammals, though strong in insecticidal and fungicidal action, and therefore their agricultural use has come into question.

An object of the present invention is to provide novel compounds which are strong in both insecticidal and fungicidal action but are low in toxicity to mammals and contain no such heavy metal as in the case of mercury preparations.

Another object of the present invention is to provide a process for preparing novel insecticidal and fungicidal compounds.

A further object of the present invention is to provide excellent insecticidal, fungicidal compositions.

Other objects of the present invention will be apparent from the following description.

In order to accomplish these objects, the present invention provides novel organic phosphorothiolates of the formula (I).

Further the present invention provides a process for producing novel organic phosphorothiolates of the formula (I), which comprises reacting a thiophosphate having the formula,

wherein R and B are as defined previously, with an alkali hydrosulfide having the formula,

M·SH    (III)

wherein M is an alkali metal, to form a thiophosphate having the formula,

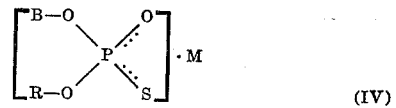

wherein R, B and M are as defined previously, and then reacting the thiophosphate with a halide having the formula,

Y·A    (V)

wherein Y is a halogen atom; and A is as defined previously.

Furthermore the present invention provides insecticidal and fungicidal compositions containing, as active ingredients, novel organic phosphorothiolates of the formula (I).

The organic phosphorothiolates of the formula (I) have insecticidal actions and are able to completely and advantageously control agricultural and sanitary injurious insects. They are as strong as O,O-dimethyl-O-(3-methyl-4-nitrophenyl)-thiophosphate or O,O-diethyl-O-(4-nitrophenyl)thiophosphate and are applicable to various insects of a wide scope. That is, they show activities not only to rice injurious insects such as rice stem borers planthoppers and leafhoppers but also to injurious insects belonging to the orders *Coleoptera, Lepidoptera* and *Diptera*, and to plant parasitic nematodes. Particularly, the present compounds are characteristic in that they show strong toxicity against mites and scale insects, and that they show marked activities to beetles such as adzuki bean weevils, rice weevils and leaf rollers.

Further, the present compounds having fungicidal effects on various plant diseases and show prominent controlling effects to rice blast, rice Helminthosporium leaf spot, rice sheath blight, and the like. The present compounds have both insecticidal and fungicidal actions and hence can simultaneously control both plant diseases and injurious insects. This is an excellent point which has never been seen heretofore.

The present compounds do not contain such heavy metal as in the case of mercury preparations, nor show such strong acute toxicity as in the case of O,O-diethyl-o-(p-nitrophenyl)-thiophosphate but are less toxic, and hence are markedly advantageous in handling.

The organic phosphorothiolates of the formula (I) are lower in toxicity to mammals and can be used safely. Moreover, they can be formulated into insecticidal, fungicidal compositions high in effects of controlling injurious insects and plant diseases and can be advantageously used in various fields as chemicals for agriculture, horticulture, enviroment santation and stock-raising.

Typical examples of the organic phosphorothiolate compounds having the formula (I) are as follows:

| Compound No. | Structural formula |
|---|---|
| (1) | (CH₃)₂N-C₆H₄-O-P(=O)(OC₂H₅)-S-sec-C₄H₉ |
| (2) | C₆H₅-C₆H₄-O-P(=O)(OC₂H₅)-S-sec-C₄H₉ |
| (3) | (o-OCH₃)C₆H₄-O-P(=O)(OC₂H₅)-S-CH₂CH₂-C₆H₅ |
| (4) | (o-OCH₃)C₆H₄-O-P(=O)(OC₂H₅)-S-sec-C₄H₉ |
| (5) | C₆H₅-CH₂-C₆H₄-O-P(=O)(OC₂H₅)-S-sec-C₄H₉ |
| (6) | CH₃CONH-C₆H₄-O-P(=O)(OC₂H₅)-S-CH₂-C₆H₅ |
| (7) | C₆H₅-C₆H₄-O-P(=O)(OC₂H₅)-S-CH₂C(CH₃)=CH₂ |
| (8) | (CH₃)₂N-C₆H₄-O-P(=O)(OC₂H₅)-S-CH₂CH₂-C₆H₅ |
| (9) | C₆H₅-C₆H₄-O-P(=O)(OC₂H₅)-S-n-C₃H₇ |
| (10) | C₆H₅-C₆H₄-O-P(=O)(OC₂H₅)-S-iso-C₄H₉ |
| (11) | C₆H₅-CH₂-C₆H₄-O-P(=O)(OC₂H₅)-S-CH₂CH₂-C₆H₅ |
| (12) | naphthyl-O-P(=O)(OC₂H₅)-S-iso-C₄H₉ |
| (13) | naphthyl-O-P(=O)(OC₂H₅)-S-sec-C₄H₉ |
| (14) | naphthyl-O-P(=O)(OC₂H₅)-S-n-C₃H₇ |
| (15) | naphthyl-O-P(=O)(OC₂H₅)-S-CH₂CH=CH₂ |
| (16) | naphthyl-O-P(=O)(OC₂H₅)-S-sec-C₄H₉ |
| (17) | naphthyl-O-P(=O)(OC₂H₅)-S-n-C₃H₇ |
| (18) | naphthyl-O-P(=O)(OC₂H₅)-S-CH₂CH₂Cl |
| (19) | naphthyl-O-P(=O)(OC₂H₅)-S-CH₂CH₂-C₆H₅ |

In the present invention organic phosphorothiolates are produced as follows:

Alkali metal hydrosulfide is prepared by introducing hydrogensulfide into a solution of alkali metal hydroxide until the solution is saturated by hydrogensulfide. Examples of the solvent used in this procedure include alcohols such as methanol, ethanol or methyl Cellosolve, water, dimethylformamide and dimethyl sulfoxide, and those of the alkali metal hydroxide include sodium hydroxide and potassium hydroxide. Into the thus obtained solution of alkali metal hydrosulfide, 1 mole of thionophosphate of the formula (II) per 1 mole of the alkali metal hydroxide is added, and the resultant reaction mixture is stirred with heating to result in dealkylation of the thionophosphate and to obtain crystals or viscous oily substance of thiophosphate of the formula (IV). After or without isolation, the thus obtained thiophosphate of the formula (IV) is subjected to condensation reaction with halide of the formula (V) by contacting 1 mole of the thiophosphate with 0.9–1.3 mole of the halide in the presence or absence of a suitable solvent.

Examples of the solvent used include alcohols such as methanol or ethanol, ketones such as acetone or methyl ethyl ketone and water.

After the completion of the condensation reaction, the solvent is removed under reduced pressure, an organic solvent such as toluene is added into the obtained residue, the resultant solution is washed thoroughly with a diluted aqueous alkaline solution such as a diluted aqueous sodium carbonate solution, and with water, and then the organic layer is dried over a drying agent and concentrated by removing the solvent under reduced pressure to give the objective organic phosphorothiolate in good yield. The thus obtained organic phosphorothiolate is sufficiently pure, but, if necessary, may be purified by column chromatograph or vacuum distillation.

In the dealkylation of the present invention, reaction temperature and reaction time depend on the kind of the starting materials and the solvent used, but, in general, the reaction requires the boiling point of the solvent and several or several tens hours. In the condensation reaction of the present invention, the reaction requires, for example, 30°–100° C. and several hours. In this step, employment of a catalytic amount of iodine may result in a good yield of the reaction.

Examples of the starting materials employed in the present invention, i.e. thionophosphates, hydrosulfides and halides are as shown below.

Thionophosphates:
O,O-Dimethyl-O-(4-phenylphenyl)thionophosphate.
O,O-Dimethyl-O-(4-benzylphenyl)thionophosphate.
O,O-Dimethyl-O-(2-chloro-4-phenylphenyl) thionophosphate.
O,O-Dimethyl-O-(2-methoxyphenyl)thionophosphate.
O,O-Dimethyl-O-[3-(N,N-dimethylamino)phenyl] thionophosphate.
O,O-Diethyl-O-(4-phenylphenyl)thionophosphate.
O,O-Diethyl-O-(2-phenylphenyl)thionophosphate.
O,O-Diethyl-O-(2-chloro-4-phenylphenyl) thionophosphate.
O,O-Diethyl-O-(4-benzylphenyl)thionophosphate.
O,O-Diethyl-O-[3-(N,N-dimethylamino)phenyl] thionophosphate.
O,O-Diethyl-O-(4-acetamidophenyl)thionophosphate.
O,O-Diethyl-O-(4-methoxyphenyl)thionophosphate.
O,O-Diethyl-O-(2-methoxyphenyl)thiophosphate.
O,O-Di-n-propyl-O-(4-phenylphenyl)thionophosphate.
O,O-Di-n-propyl-O-(2-chloro-4-phenylphenyl) thionophosphate.
O,O-Dimethyl-O-(α-naphthyl)thionophosphate.
O,O-Dimethyl-O-(β-naphthyl)thionophosphate.
O,O-Diethyl-O-(α-naphthyl)thionophosphate.
O,O-Diethyl-O-(β-naphthyl)thionophosphate.
O,O-Di-n-propyl-O-(α-naphthyl)thionophosphate.
O,O-Di-n-propyl-O-(β-naphthyl)thionophosphate.
O,O-Di-n-butyl-O-(α-naphthyl)thionophosphate.
O,O-Di-n-butyl-O-(β-naphthyl)thionophosphate.

Hydrosulfides:
Sodium hydrosulfide.
Potassium hydrosulfide.

Halides:
Methyl bromide.
Ethyl bromide.
n-Propyl bromide.
i-Propyl bromide.
n-Butyl bromide.
i-Butyl bromide.
sec-Butyl bromide.
i-Amyl bromide.
Allyl chloride.
Methallyl chloride.
Propargyl bromide.
Benzyl chloride.
β-Phenylethyl bromide.
1-Chloro-2-bromoethane.

In actual application, the organic phosphorothiolates of the present invention may be used singly without incorporation of other ingredients, or, for easier application as controlling chemicals, they may be used in admixture with carriers. The present organic phosphorothiolates are ordinarily formulated, according to procedures thoroughly known to those skilled in the art without necessitating any special conditions, into such forms as emulsifiable concentrates, wettable powders, oil sprays, dusts, ointments, granules, aerosols, fumigants, etc., and thus can be used in any desired forms using suitable inert carriers. Further, the present organic phosphorothiolates may be used in admixture with one or two or more of other chemicals, whereby the effects thereof can be further broadened. For example, they can be used in combination with organophosphorus type insecticides such as O,O-dimethyl-S-(1,2-dicarboethoxy)ethyl phosphorodithioate, O-ethyl O-(4-nitrophenyl)phenyl phosphonothioate, O,O-dimethyl S-(N-methyl carbamyl)methyl phosphorodithioate, etc., organochlorine type insecticides such as γ-Benzene hexachloride, p,p-dichlorodiphenyl trichloroethane, etc.; carbamate type insecticides such as 3,4-dimethylphenyl-N-methylcarbamate, 1-naphthyl-N-methylcarbamate, etc.; pyrethroid type insecticides such as allethrin, phthalthrin, etc.; organochlorine type fungicides such as pentachlorobenzyl alcohol, pentachlorobenzaldoxime, etc.; organosulfur type fungicides; and organo-arsenic type fungicides, and synergistic effects can be expected depending on combinations. Moreover, the present compounds are easily miscible with nematocides, mitecides, herbicides, fertilizers, plant growth-regulators, synergists, attractants, repellents and the like chemicals, whereby multipurpose compositions can be prepared.

The following examples illustrate the invention, however they are not intended to limit the present invention. In the examples, the numerals in the parentheses show the aforesaid numbers representing the present compounds.

EXAMPLE 1

Preparation of compound (2)

A solution of 8.4 g. (0.15 mole) of potassium hydroxide in 100 ml. of ethyl alcohol was saturated with hydrogen sulfide to form an ethyl alcohol solution of potassium hydrosulfide. This solution was charged with 48.4 g. (0.15 mole) of O,O-diethyl-O-(4-phenylphenyl)-thionophosphate, and was then refluxed with stirring for 5 hours. After removing the ethyl alcohol by reduced pressure distillation, a deposited crystal was suspended in ether. Subsequently, the suspension was filtered and then the obtained residue was dried to obtain 40.4 g. of a milky white crystal of potassium O-ethyl-O-4-phenylphenyl phosphorothioate.

33.2 g. (0.1 mole) of this thiophosphate was dissolved in 100 ml. of ethyl alcohol. The resulting solution was charged at room temperature with 15.1 g. (0.11 mole) of sec.-butyl bromide, and was then refluxed with stirring for 7 hours. After removing the solvent by distillation, toluene was added to the residue. The mixture was washed with 5% sodium carbonate aqueous solution and then several times with water, and the toluene layer was dried with anhydrous sodium sulfate. Thereafter, the toluene was removed by reduced pressure distillation to obtain 17.2 g. of pale yellow oily substance of O-ethyl-O-(4-phenylphenyl) - S - (sec)-butylphosphorothiolate, $n_D^{21.5}$ 1.5739.

Elementary analysis for $C_{18}H_{23}O_3PS$:

|  | Calculated | Found |
|---|---|---|
| P (percent) | 8.84 | 9.03 |
| S (percent) | 9.15 | 9.19 |

EXAMPLE 2

Preparation of compound (10)

A solution of 33.2 g. (0.1 mole) of potassium, O-ethyl-O-(4-phenylphenyl)phosphorothioate and 15.1 g. (0.11 mole) of isobutyl bromide in 100 ml. of ethyl alcohol was refluxed with stirring for 3 hours. This solution was treated in a manner similar to that in Example 1 to obtain 16.7 g. of pale yellow oily substance of O-ethyl-O-(4-phenylphenyl)-S-(iso) - butyl phosphorothiolate, $n_D^{27.5}$ 1.5687.

Elementary analysis for $C_{18}H_{23}O_3PS$:

|  | Calculated | Found |
|---|---|---|
| P (percent) | 8.84 | 8.91 |
| S (percent) | 9.15 | 9.43 |

EXAMPLE 3

Preparation of compound (5)

A solution of 34.6 g. (0.1 mole) of a milky white crystal of potassium O-ethyl-O-(4-benzylphenyl)phosphorothioate prepared in a manner similar to that in Example 1 and 15.1 g. (0.11 mole) of (sec.)-butyl bromide in 100 ml. of ethyl alcohol was refluxed with stirring for 7 hours. This solution was treated in a manner similar to that in Example 1 to obtain 18.4 g. of yellow oily substance of O-ethyl-O-(4-benzylphenyl)-S-sec.-butylphosphorothiolate, $n_D^{31}$ 1.5490.

Elementary analysis for $C_{19}H_{25}O_3PS$:

|  | Calculated | Found |
|---|---|---|
| P (percent) | 8.50 | 8.37 |
| S (percent) | 8.80 | 8.89 |

EXAMPLE 4

Preparation of compound (11)

A solution of 4.6 g. (0.13 mole) of potassium O-ethyl-O-(4-benzylphenyl)phosphorothioate and 18.5 g. (0.1 mole) of β-phenylethyl bromide in 100 ml. of ethyl alcohol was refluxed with stirring for 4 hours. This solution was treated in a manner similar to that in Example 1 to obtain 33.1 g. of yellow oily substance of O-ethyl-O-(4 - benzylphenyl) - S - 2-phenylethyl phosphorothiolate, $n_D^{34}$ 1.5725.

Elementary analysis for $C_{23}H_{25}O_3PS$:

|  | Calculated | Found |
|---|---|---|
| P (percent) | 7.51 | 7.76 |
| S (percent) | 7.77 | 7.93 |

EXAMPLE 5

Preparation of compound (3)

A solution of 6.0 g. (0.15 mole) of sodium hydroxide in 100 ml. of ethyl alcohol was saturated with hydrogen sulfide to form an ethyl alcohol solution of sodium hydrosulfide. This solution was charged with 41.4 g. (0.15 mole) of O,O-diethyl-O-2-methoxyphenyl thionophosphate and was refluxed with stirring for 5 hours. After removing the solvent by distillation, the resulting reddish brown oily residue was dissolved in water. Subsequently, the solution was washed 2 times with toluene, and then the water was removed by reduced pressure distillation to obtain 33.0 g. of reddish brown oily sodium O-ethyl-O-(2-methoxyphenyl)phosphorothioate.

27.0 g. (0.1 mole) of this thiophosphate and 18.5 g. (0.1 mole) of β-phenylethyl bromide were dissolved in 100 ml. of ethyl alcohol, and the solution was refluxed with stirring for 5 hours. This solution was treated in a manner similar to that in Example 1 to obtain 27.8 g. of reddish brown oily O-ethyl-O-(2-methoxyphenyl)-S-2-phenylethyl phosphorothiolate, $n_D^{31}$ 1.5495.

Elementary analysis for $C_{17}H_{21}O_4PS$:

|  | Calculated | Found |
|---|---|---|
| P (percent) | 8.79 | 8.70 |
| S (percent) | 9.10 | 9.41 |

EXAMPLE 6

Preparation of compound (4)

A solution of 27.0 g. (0.1 mole) of sodium O-ethyl-O-(2-methoxyphenyl)phosphorothioate and 15.1 g. (0.11 mole) of sec.-butyl bromide in 100 ml. of ethyl alcohol was refluxed with stirring for 6 hours. This solution was treated in a manner similar to that in Example 1 to obtain 15.2 g. of reddish brown oily O-ethyl-O-(2-methoxyphenyl)-S-sec.-butyl phosphorothiolate, $n_D^{28}$ 1.5139.

Elementary analysis for $C_{13}H_{21}O_4PS$:

|  | Calculated | Found |
|---|---|---|
| P (percent) | 10.18 | 10.45 |
| S (percent) | 10.53 | 10.18 |

EXAMPLE 7

Preparation of compound (1)

A solution of 29.9 g. (0.1 mole) of potassium O-ethyl-O-[3-(N,N-dimethylamino)-phenyl]phosphorothioate obtained in a manner similar to that in Example 5 and 15.1 g. (0.11 mole) of sec.-butyl bromide in 100 ml. of ethyl alcohol was refluxed with stirring for 5 hours. This solution was treated in a manner similar to that in Example 1 to obtain 16.0 g. of reddish brown oily O-ethyl-O-[3-(N,N-dimethyl-amino)-phenyl] - S - sec.-butyl phosphorothiolate, $n_D^{23.5}$ 1.5334.

Elementary analysis for $C_{14}H_{24}NO_3PS$:

|  | Calculated | Found |
|---|---|---|
| P (percent) | 9.76 | 9.62 |
| S (percent) | 10.10 | 10.21 |
| N (percent) | 4.41 | 4.23 |

EXAMPLE 8

Preparation of compound (8)

A solution of 29.9 g. (0.1 mole) of potassium O-ethyl-O-[3 - (N,N - dimethylamino)-phenyl] phosphorothioate and 18.5 g. (0.1 mole) of β-phenylethyl bromide in 100 ml. of ethyl alcohol was refluxed with stirring for 5 hours. This solution was treated in a manner similar to that in Example 1 to obtain 28.9 g. of reddish brown oily O-ethyl-O-[3-(N,N-dimethylamino)-phenyl] - S - 2 - phenylethyl phosphorothiolate, $n_D^{23.5}$ 1.5733.

Elementary analysis for $C_{18}H_{24}NO_3PS$:

|  | Calculated | Found |
|---|---|---|
| P (percent) | 8.47 | 8.06 |
| S (percent) | 8.77 | 8.81 |
| N (percent) | 3.83 | 3.71 |

EXAMPLE 9

Preparation of compound (6)

A solution of 31.3 g. (0.1 mole) of potassium O-ethyl-(4-acetamidephenyl)phosphorothioate obtained in a manner similar to that in Example 5 and 12.7 g. (0.1 mole) of benzyl chloride in 80 ml. of water was stirred at 80° C. for 3 hours. This solution was treated in a manner similar to that in Example 1 to obtain 33.9 g. of yellow oily O-ethyl-O-(4-acetamidephenyl)-S-benzyl phosphorothiolate, $n_D^{30}$ 1.5770.

Elementary analysis for $C_{17}H_{20}NO_4PS$:

|  | Calculated | Found |
|---|---|---|
| P (percent) | 8.48 | 8.66 |
| S (percent) | 8.77 | 8.97 |
| N (percent) | 3.83 | 3.73 |

EXAMPLE 10

Preparation of compound (18)

A solution of 8.4 g. (0.15 mole) of potassium hydroxide in 100 ml. of ethyl alcohol was saturated with hydrogen sulfide to prepare an ethyl alcohol solution of potassium hydrosulfide. This solution was charged with 44.5 g. (0.15 mole) of O,O-diethyl-O-β-naphthyl thionophosphate and was refluxed with stirring for 5 hours. After removing the ethyl alcohol by reduced pressure distillation, a deposited crystal was suspended in ether. The suspension was filtered and then the obtained residue was dried to obtain 36.8 g.

of a milky white crystal of potassium O-ethyl-O-β-naphthyl phosphorothioate, m.p. 85°–87° C.

30.6 g. (0.1 mole) of this thiophosphate was dissolved in 100 ml. of ethyl alcohol. This solution was charged at room temperature with 14.4 g. (0.1 mole) of 1-chloro-2-bromoethane and was refluxed with stirring for 10 hours. This solution was treated in a manner similar to that in Example 1 to obtain 19.9 g. of pale yellow oily O-ethyl-O - β - naphthyl - S - 2 - chloroethyl phosphorothiolate, $n_D^{22}$ 1.5907.

Elementary analysis for $C_{14}H_{16}ClO_3PS$:

|  | Calculated | Found |
|---|---|---|
| P (percent) | 9.36 | 9.36 |
| S (percent) | 9.69 | 9.89 |

EXAMPLE 11

Preparation of compound (16)

A solution of 30.6 g. (0.1 mole) of potassium O-ethyl-O-β-naphthyl phosphorothioate obtained in a manner similar to that in Example 10 and 15.1 g. (0.11 mole) of sec.-butyl bromide in 100 ml. of ethyl alcohol was refluxed with stirring for 7 hours. This solution was treated in a manner similar to that in Example 10 to obtain 16.5 g. of yellow oily O-ethyl-O-β-naphthyl-S-sec.-butyl phosphorothiolate, $n_D^{25}$ 1.5832.

Elementary analysis for $C_{16}H_{21}O_3PS$:

|  | Calculated | Found |
|---|---|---|
| P (percent) | 9.55 | 9.71 |
| S (percent) | 9.88 | 10.14 |

EXAMPLE 12

Preparation of compound (17)

A solution of 30.6 g. (0.1 mole) of potassium O-ethyl-O-β-naphthyl phosphorothioate obtained in a manner similar to that in Example 10 and 13.5 g. (0.11 mole) of n-propyl bromide in 100 ml. of ethyl alcohol was refluxed with stirring for 5 hours. This solution was treated in a manner similar to that in Example 10 to obtain 25.2 g. of pale yellow oily O-ethyl-O-β-naphthyl-S-n-propyl phosphorothiolate, $n_D^{25}$ 1.5846.

Elementary analysis for $C_{15}H_{19}O_3PS$:

|  | Calculated | Found |
|---|---|---|
| P (percent) | 9.98 | 10.18 |
| S (percent) | 10.33 | 10.37 |

EXAMPLE 13

Preparation of compound (19)

A solution of 6.7 g. (0.12 mole) of potassium hydroxide in 50 ml. of ethyl alcohol was saturated with hydrogen sulfide to form an ethyl alcohol solution of potassium hydrosulfide. This solution was charged with 35.6 g. (0.12 mole) of O,O-diethyl-O-α-naphthyl thionophosphate and was refluxed with stirring for 5 hours. Subsequently, the solution was treated in a manner similar to that in Example 10 to obtain 34.0 g. of a moisture absorptive brown crystal of potassium O-ethyl-O-α-naphthyl phosphorothioate.

30.6 g. (0.1 mole) of this thiophosphate and 18.5 g. (0.1 mole) of β-phenylethyl bromide were dissolved in 100 ml. of ethyl alcohol, and the solution was refluxed with stirring for 4 hours. The solution was treated in a manner similar to that in Example 10 to obtain 26.1 g. of reddish brown oily O-ethyl-O-α-naphthyl-S-2-phenylethyl phosphorothiolate, $n_D^{26.5}$ 1.5962.

Elementary analysis for $C_{20}H_{21}O_3PS$:

|  | Calculated | Found |
|---|---|---|
| P (percent) | 8.32 | 7.97 |
| S (percent) | 8.61 | 8.72 |

EXAMPLE 14

Preparation of compound (13)

A solution of 30.6 g. (0.1 mole) of potassium O-ethyl-O-α-naphthyl phosphorothioate and 15.1 g. (0.11 mole) of sec-butyl bromide in 100 ml. of ethyl alcohol was refluxed with stirring for 5 hours. Subsequently, the solution was treated in a manner similar to that in Example 10 to obtain 16.7 g. of reddish brown oily O-ethyl-O-α-naphthyl-S-sec-butyl phosphorothiolate, $n_D^{26.5}$ 1.5720.

Elementary analysis for $C_{16}H_{21}O_3PS$:

|  | Calculated | Found |
|---|---|---|
| P (percent) | 9.55 | 9.78 |
| S (percent) | 9.88 | 9.82 |

EXAMPLE 15

Preparation of compound (12):

A solution of 30.6 g. (0.1 mole) of potassium O-ethyl-O-α-naphthyl phosphorothioate and 15.1 g. (0.11 mole) of isobutyl bromide in 100 ml. of ethyl alcohol was refluxed with stirring for 3 hours. Subsequently, the solution was treated in a manner similar to that in Example 10 to obtain 15.9 g. of reddish brown oily O-ethyl-O-α-naphthyl-S-isobutyl phosphorothiolate, $n_D^{27.5}$ 1.5742.

Elementary analysis for $C_{16}H_{21}O_3PS$:

|  | Calculated | Found |
|---|---|---|
| P (percent) | 9.72 | 9.55 |
| S (percent) | 10.03 | 9.88 |

EXAMPLE 16

Preparation of emulsifiable concentrates:

The individual compounds set forth in the table below were thoroughly mixed with given proportions of each solvent and emulsifier shown in the table to obtain homogeneous emulsifiable concentrates. In application, the emulsifiable concentrates were diluted with water and the aqueous emulsions were sprayed.

| Active ingredient (percent) | Solvent (percent) | Emulsifier (percent) |
|---|---|---|
| Compound (2), 50 | Xylene, 30 | Sorpol* 2020, 20. |
| Compound (11), 20 | Cyclohexanone 50 | Sorpol 2492, 30. |
| Compound (12), 50 | Xylene, 30 | Sorpol 2020, 20. |
| Compound (15), 20 | Cyclohexanone, 50 | Sorpol 2492, 30. |

*Registered trade name for an emulsifier produced by Toho Chemical Co.

EXAMPLE 17

Preparation of wettable powder:

40 Parts of the compound (5) and 5 parts of Sorpol 5029 (registered trade name for an emulsifier produced by Toho Chemical Co.) were thoroughly mixed together. The mixture was added drop by drop to, and mixed with, 55 parts of 200 mesh talc under stirring in a mortar, whereby a wettable powder is obtained. In application, the wettable powder was diluted with water and the solution was sprayed.

EXAMPLE 18

Preparation of dusts:

The individual compounds set forth in the table below in such proportions as shown in the table were dissolved in a small amount of acetone. After thoroughly mixing the solutions with 200 mesh talc, the acetone was removed by vaporization to obtain respective dusts. In application, they were dusted as they were.

| Active ingredient (percent) | Extender (percent) |
|---|---|
| Compound (1), 2 | Talc, 98. |
| Compound (3), 4 | Talc, 96. |
| Compound (17), 2 | Talc, 98. |
| Compound (19), 4 | Talc, 96. |

EXAMPLE 19

Preparation of granules:

The individual compounds set forth in the table below in such proportions as shown in the table were mixed with each binder and extender in this order in such proportions as shown in the table. After kneading with a small amount of water, the mixtures were individually granulated b means of a granulator and were then dried to obtain granules. In application, the granules were sprinkled as they were.

| Active ingredient (percent) | Binder (percent) | Extender (percent) |
|---|---|---|
| Compound (7), 2 | Soduim lignosulfonate, 1 | Clay, 97. |
| Compound (9), 5 | Sodium lignosulfonate, 2 | Clay, 93. |
| Compound (13), 2 | Sodium lignosulfonate, 1 | Clay, 97. |
| Compound (16), 5 | Sodium lignosulfonate, 2 | Clay, 93. |

In order to clarify the excellent characteristics and effects of the present compounds, typical test results are shown below with reference to examples. In the examples, the numerals shown in the parentheses are the numbers representing the compounds exemplified previously.

EXAMPLE 20

Mottled kidney bean plants at the 2 leaves stage, which had elapsed 20 days after the sowing, were parasitized with a large number of two-spotted spider mites (*Tetranychus telarius*). Subsequently, the leaves of the plants parasitized with said spider mites were dipped for 1 minute in each of aqueous solutions of the present compounds in the form of wettable powders. Thereafter, water was fed so as not to wither the leaves. After 48 hours, the alive and dead of the mites were observed by means of a magnifying glass and, from the mortalities, and Lc 50 values were calculated from the mortality of the mites. The results were as set forth in Table 1.

TABLE 1

| | Lc 50 (times) | Lc 50 (p.p.m.) |
|---|---|---|
| Compound number: | | |
| (2) | 1,200,000 | 0.834 |
| (3) | 640,000 | 1.563 |
| (4) | 600,000 | 1.667 |
| (5) | 16,000,000 | 0.063 |
| (10) | 1,200,000 | 0.834 |
| (12) | 3,000,000 | 0.333 |
| (13) | 2,048,000 | 0.488 |
| (14) | 1,000,000 | 1.000 |
| (16) | 2,000,000 | 0.500 |
| O,O-dimethyl S-(N-methyl carbamoyl) methyl phosphorodithioate | 500,000 | 2.000 |
| Ethyl 4,4'-dichlorobenzilate | 100,000 | 10.000 |

EXAMPLE 21

Dipping effects on adzuki bean weevils (*Callosobruchus chinensis* Linné)

Adzuki bean weevil adults within 1 day after emergence were dipped for 1 minute in each of aqueous emulsions of the present compounds in the form of emulsifiable concentrates. Subsequently, excess liquid on the surfaces of the weevil bodies was absorbed by means of a filter paper. After 24 hours, the alive and dead of the weevils were observed and Lc 50 values were calculated from the mortality of the weevils. The results were as set forth in Table 2.

TABLE 2

| | Lc 50 (times) | Lc 50 (p.p.m.) |
|---|---|---|
| Compound number: | | |
| (1) | 56,000 | 17.86 |
| (2) | 190,000 | 5.26 |
| (5) | 50,000 | 20.00 |
| (10) | 180,000 | 5.56 |
| (12) | 220,000 | 4.55 |
| (13) | 250,000 | 4.00 |
| (16) | 300,000 | 3.33 |
| (17) | 180,000 | 5.56 |
| O,O-dimethyl O-(3-methyl 4-nitrophenyl) phosphorothioate | 55,000 | 18.18 |
| O,O-dimethyl S-(1,2-dicarboethoxyethyl) phosphorodithioate | 11,000 | 90.91 |

EXAMPLE 22

Acute oral toxicity to mice

Each of aqueous emulsions of the present compounds in the form of emulsifiable concentrates was orally administered to male mice of about 20 g. in body weight. From the mortalities of the mice within a period of 48 hours after the administration, $L_D$ 50 values were calculated. The results were as set forth in Table 3.

TABLE 3

| Compound No.: | $L_D$ 50 (mg./kg.) |
|---|---|
| (3) | 200 |
| (4) | 100 |
| (5) | 150 |
| (8) | 300 |
| (10) | 200 |
| (12) | 100 |
| (13) | 100 |
| (18) | 400 |
| (19) | 200 |
| O,O - diethyl O - (4 - nitrophenyl) phosphorothioate | 6 |
| O-ethyl O - (4 - nitrophenyl) phenylphosphonothioate | 16 |

EXAMPLE 23

Full grown northern house mosquito (*Culex pipiens palléns*) larvae were put into water placed in 500 cc. beakers. Into the water was charged each of the present compounds in the form of granules. After 24 hours, the alive and dead of the larvae were observed and, from the mortalities thereof, Lc 50 values were calculated. The results were as set forth in Table 4.

TABLE 4

| Compound No.: | Lc 50 (p.p.m.) |
|---|---|
| (2) | 0.078 |
| (5) | 0.035 |
| (8) | 0.074 |
| (10) | 0.023 |
| (11) | 0.029 |
| (12) | 0.029 |
| (13) | 0.026 |
| (16) | 0.025 |
| (19) | 0.011 |
| O,O - dimethyl S-(1,2 - dicarboethoxy) ethyl phosphorodithioate | 0.04 |
| O,O-dimethyl 1 - hydroxy - 2,2,2 - trichloroethyl phosphonate | 0.2 |

EXAMPLE 24

Effects of curing rice blast

Rice plants (variety: Wase Asahi), which had been cultivated to the 3 leaves stage in flower pots of 9 cm. in diameter, were sprayed with 7 ml. per pot of each of given concentration liquids of test compounds. After 1 day, the plants were sprayed to inoculate with a spore suspension of rice blast fungus (*Pyricularia oryzae*). 4 days after, the number of disease spots generated was counted to investigate the fungicidal effects of the compounds. The results were as set forth in Table 5.

TABLE 5

| | Active ingredient concentration (p.p.m.) | Control value |
|---|---|---|
| Compound number: | | |
| (3) | 1,000 | 92 |
| (5) | 1,000 | 90 |
| (6) | 1,000 | 93 |
| (8) | 1,000 | 95 |
| (11) | 1,000 | 90 |
| (13) | 1,000 | 90 |
| (18) | 1,000 | 94 |
| (19) | 1,000 | 100 |
| O,O-diethyl-S-benzyl phosphorothiolate | 1,000 | 92 |
| None-treatment | | 0 |

Control value was calculated according to the following equation:

Control value $$= \frac{\left(\begin{array}{c}\text{Number of spots in} \\ \text{none-treated leaves}\end{array}\right) - \left(\begin{array}{c}\text{Number of sports} \\ \text{in treated leaves}\end{array}\right)}{\text{Number of spots in none-treated leaves}} \times 100$$

EXAMPLE 25

Insecticidal effects on smaller brown planthoppers (*Laodelphax striatellus* Fallén)

Rice seedlings (15–20 cm. in height), which had elapsed 15 days after sowing, were dipped for 1 min. in a diluted emulsion having a given concentration of the emulsifiable concentrate of Example 16. After air-drying, the seedlings were placed in a large-size test tube. Subsequently, 20–30 smaller brown planthoppers were released in the tube and then the tube was covered with gauze. After 24 hours, mortalities of the insects were calculated and, from said mortalities, Lc 50 values were calculated. The results were as set forth in Table 6.

TABLE 6

| | Lc 50 (times) | Lc 50 (p.p.m.) |
|---|---|---|
| Compound number: | | |
| (1) | 56,000 | 17.86 |
| (2) | 190,000 | 5.26 |
| (5) | 50,000 | 20.00 |
| (9) | 150,000 | 6.67 |
| (12) | 40,000 | 25.00 |
| (13) | 56,000 | 17.86 |
| (14) | 50,000 | 20.00 |
| (16) | 55,000 | 18.18 |
| O,O-dimethyl S-(1,2-dicarboethoxy)ethylphosphorodithioate | 50,000 | 20.00 |
| 3,5-xylyl N-methylcarbamate | 60,000 | 16.67 |

EXAMPLE 26

An emulsion prepared by diluting 50% emulsifiable concentrate of the present compound with water to 500 times was spread over young apple trees on which many two-spotted spider mites (*Tetranyohus telarius* Linné) lived in an amount of 150 l./1000 m.². Before spreading and 3, 5, 7, 11 and 25 days after spreading, the number of the parasitic mites was measured to obtain results as shown in Table 7.

TABLE 7

| | Before spreading | After spreading, days | | | | |
|---|---|---|---|---|---|---|
| | | 3 | 5 | 7 | 11 | 25 |
| (1) | 160.1 | 0 | 0 | 0 | 18.2 | 59.4 |
| (3) | 171.5 | 1.5 | 0 | 5.8 | 21.4 | 61.3 |
| (6) | 145.8 | 0 | 0 | 9.1 | 63.8 | 89.5 |
| (10) | 153.1 | 0.2 | 1.7 | 7.3 | 12.3 | 41.2 |
| (11) | 159.3 | 0.8 | 0 | 2.1 | 6.8 | 21.3 |
| O,O-dimethyl S-(1,2-dicarboethoxy) ethyl phosphorodithioate | 164.9 | 0.4 | 0 | 3.2 | 5.3 | 11.1 |
| Control | 148.2 | 193.4 | 202.3 | 181.4 | 174.3 | 145.1 |

NOTE.—The figures mean the average number of adults on 10 apple leaves.

EXAMPLE 27

Rice plants at the offshoot stage, which had elapsed 30 days after sowing in pots, were parasitized with about 70 eggs of rice stem borers (*Chilo suppresalis Walker*). After 4 days, the rice plants were sprayed with 8 ml. per pot of each of aqueous diluted solutions of the present compounds in the form of wettable powders. 5 days thereafter, the rice stems were broken and the alive and dead of the rice stem borer larvae were observed to calculate the mortalities thereof. The results were as set forth in Table 8. Each mortality is an average value obtained by testing 3 pots.

TABLE 8

| | Concentration (p.p.m.) | Number of test insects | Mortality, percent |
|---|---|---|---|
| Compound number: | | | |
| (2) | 1,000 | 135 | 93.2 |
| (5) | 1,000 | 211 | 81.3 |
| (6) | 1,000 | 183 | 100.0 |
| (9) | 1,000 | 121 | 99.2 |
| (10) | 1,000 | 144 | 95.4 |
| (12) | 2,000 | 121 | 100.0 |
| (13) | 2,000 | 123 | 99.2 |
| (17) | 2,000 | 165 | 83.1 |
| (19) | 2,000 | 98 | 93.2 |
| O,O-diethyl O-(4-nitrophenyl)-phosphorothioate | 2,000 | 111 | 95.4 |

EXAMPLE 28

Orange fruits, which had been parasitized with a large number of arrowhead scale adults (*Pseudococcus comstocki* Kuwana), were dipped for 2 minutes in each of aqueous diluted solutions of the present compounds in the form of wettable powders and were allowed to stand for 20 days in a thermostat at 25° C. Subsequently, the scales were stripped off from the fruit surfaces and the alive and dead thereof were observed with a magnifying glass. The results were as set forth in Table 9.

TABLE 9

| | Concentration (diluted to) | Concentration (p.p.m.) | Mortality (percent) |
|---|---|---|---|
| Compound number: | | | |
| (1) | 2,000 times | 500 | 100.0 |
| (3) | do | 500 | 95.2 |
| (7) | do | 500 | 98.3 |
| (9) | do | 500 | 89.8 |
| (12) | 4,000 times | 250 | 100.0 |
| (13) | do | 250 | 100.0 |
| (16) | do | 250 | 100.0 |
| (19) | do | 250 | 92.3 |
| O,O-dimethyl S-(N-methylcarbamoyl)-methyl phosphorodithioate | do | 250 | 96.4 |

What is claimed is:

1. An insecticidal or fungicidal composition containing an insecticidally or fungicidally effective amount of an organic phosphorothiolate of the formula $$B-O-\overset{\overset{\displaystyle O}{\|}}{\underset{\underset{\displaystyle OR}{|}}{P}}-S-A$$

wherein R is $C_1$–$C_4$ alkyl; A is $C_1$–$C_{10}$ alkyl, $C_1$–$C_3$ haloalkyl or $C_7$–$C_{10}$ phenylalkyl; B is a group of the formula,

[structure: phenyl with $X_n$ substituents, or naphthyl]

X being phenyl, $C_7$–$C_{10}$ phenylalkyl, or halogen atom, provided that at least one X is a group other than halogen atom; and $n$ being an integer of 1–5 and a suitable inert carrier.

2. The composition of claim 1 wherein the alkyl of R and the alkyl of A are respectively ethyl and n-propyl, secondary butyl or isobutyl.

3. The composition according to claim 1 wherein the phosphorothiolate has the formula

[structure: biphenyl-O-P(=O)(OC$_2$H$_5$)-S-sec-C$_4$H$_9$]

4. The composition according to claim 1 wherein the phosphorothiolate has the formula

[structure: phenyl-CH$_2$-phenyl-O-P(=O)(OC$_2$H$_5$)-S-sec-C$_4$H$_9$]

5. The composition according to claim 1 wherein the phosphorothiolate has the formula

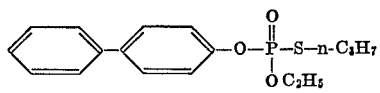

6. A process of killing insects comprising contacting said insects with an effective amount of an organic phosphorothiolate having the formula

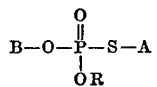

wherein R is $C_1$–$C_4$ alkyl; A is $C_1$–$C_{10}$ alkyl, $C_1$–$C_3$ haloalkyl or $C_7$–$C_{10}$ phenylalkyl; B is a group having the formula

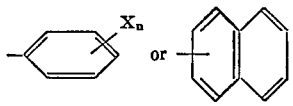

X being phenyl, $C_7$–$C_{10}$ phenylalkyl, or halogen atom, provided that at least one X is a group other than halogen atom; and $n$ being an integer of 1–5.

References Cited
UNITED STATES PATENTS 3,294,874  12/1966  Schrader _____ 260—964 X ALBERT T. MEYERS, Primary Examiner F. E. WADDELL, Assistant Examiner U.S. Cl. X.R.

424—211, 212, 217, 219